(12) United States Patent
Lind et al.

(10) Patent No.: US 6,805,802 B2
(45) Date of Patent: Oct. 19, 2004

(54) DE-WATERING PROCESS

(75) Inventors: Christopher Bruce Lind, Flanders, NJ (US); Raymond T. Pettyjohn, Sommerville, GA (US)

(73) Assignee: General Chemical Corporation, Parsippany, NJ (US)

(*) Notice: Subject to any disclaimer, the term of this patent is extended or adjusted under 35 U.S.C. 154(b) by 14 days.

(21) Appl. No.: 10/205,633

(22) Filed: Jul. 25, 2002

(65) Prior Publication Data

US 2003/0189007 A1 Oct. 9, 2003

Related U.S. Application Data

(60) Provisional application No. 60/371,276, filed on Apr. 9, 2002.

(51) Int. Cl.⁷ .................................................. C02F 1/56

(52) U.S. Cl. ....................... 210/714; 210/723; 210/728; 210/906; 210/917; 210/928

(58) Field of Search ........................ 210/609, 665–667, 210/710, 714, 725, 724, 728, 727, 928, 723, 906, 917

(56) References Cited

U.S. PATENT DOCUMENTS

| | | | | | |
|---|---|---|---|---|---|
| 3,342,742 A | * | 9/1967 | Cocks | ........................ | 252/175 |
| 3,953,330 A | * | 4/1976 | Tonkyn et al. | ............... | 210/728 |
| 4,217,210 A | * | 8/1980 | Heidenreich | ................ | 210/667 |
| 4,279,756 A | * | 7/1981 | Weiss et al. | ................ | 210/667 |
| 4,425,238 A | * | 1/1984 | Degen et al. | ............... | 210/666 |
| 4,559,143 A | * | 12/1985 | Asada et al. | ............... | 210/714 |
| 5,073,272 A | * | 12/1991 | O'Neill et al. | ............... | 210/728 |
| 5,104,552 A | * | 4/1992 | Cicchiello et al. | ......... | 210/727 |
| 5,720,888 A | * | 2/1998 | Kuo et al. | ................... | 210/734 |
| 5,766,485 A | | 6/1998 | Lind et al. | .................. | 210/711 |

* cited by examiner

Primary Examiner—Peter A. Hruskoci
(74) Attorney, Agent, or Firm—Arthur J. Plantamura

(57) ABSTRACT

Process muds are de-watered by the addition of high clay alumina. The clay is mixed with plant sludges or muds so as to cause flocculation of the solid particles, and separating the water from the solid materials, as by filtration. Various polymers and/or alum process residues can be added as well. In addition to de-watering plant sludges, this method also reduces color, and reduces the total organic carbon as well as heavy metals, from the filtered water. This permits disposal of the water to public waterways with no additional treatment.

11 Claims, No Drawings

DE-WATERING PROCESS

This application claims the benefit of U.S. Provisional Application Ser. No. 60/371,276 filed Apr. 9, 2002.

This invention relates to methods for improved separation and de-watering of process muds, such as muds from paper mills, and for removing contaminants, color, and total organic carbon (TOC) from process waste waters prior to their discharge into waterways.

BACKGROUND OF THE INVENTION

Process muds include processing water and various solids that are generated in processing plants, such as paper mill plants. This processing water must be separated from process muds prior to discharging the water to public or private waterways. The remaining solids are separately disposed of. These solids include finely divided solid particles that can be difficult to filter. De-watering of these muds is generally required due to their high water content and because many landfills have maximum requirements for water content. De-watering comprises separation of the water from the solid particles. Solids desirably are agglomerated to form a floc, or fairly large aggregates, that can be readily filtered and separated from the waste water.

Various industrial processes produce highly colored waste waters, which can vary from yellow to dark brown. Color bodies vary widely as to their source and their depth of color. Waters that are produced by the digestion of cellulosic fibers, pulp fibers, for example, from water processing during paper making, are washed several times, producing aqueous streams containing digestion chemicals, lignins, sugars, bleach or chlorine-containing chemicals, dyes, fillers, starches, and the like. A paper mill that produces 500 tons of paper per day can produce more than 20 million gallons per day of waste effluent streams. Colored solid particles in suspension in such waste water can be removed by filtration or settling. However, if the color bodies are in true solution, they are more difficult to remove. Obviously, highly colored waste waters must be treated prior to discharging them into municipal waters or natural streams, to remove any toxic compounds, and those compounds that add a smell or taste to the water.

In addition, other materials present in these muds include phosphorus, which is also a regulated contaminant, and metal salt coagulants, including heavy metal salts that are required to be removed from waste waters prior to their discharge into public waterways.

Increasingly stringent environmental regulations must be complied with as well. The color bodies present in these muds are of various types, depending on the source of the water, the process that produces these muds, and any treatments used to remove the color bodies.

Fuller, U.S. Pat. No. 3,627,679, developed a process to remove color bodies wherein the waste water is mixed with alum process residues (APR) and allowed to settle. However, the settling time is quite lengthy for the amount of color removed, and there are mechanical difficulties associated with filtering the resultant mixture.

U.S. Pat. No. 5,766,485 to Lind et al discloses a color removal treatment for paper and pulp wastewater streams comprising adding polyelectrolytes to alum process residues obtained from producing aluminum sulfate from bauxite clays. The addition of these polyelectrolytes and water-soluble polymers increases the sedimentation rate of solid particles in waste waters, and alum process residues are added to remove the color bodies. The reduction of organic residues is also highly desirable. However, these materials often must be added in large doses, which adds to the costs of process muds treatment.

Thus a method that both improves the de-watering of process muds and sludges, and also removes color and organic materials from the separated water, would be highly desirable.

SUMMARY OF THE INVENTION

We have found that high clay alumina, (HCA), a co-product of the manufacture of aluminum sulfate from bauxite, is an excellent de-watering material. The HCA is mixed with plant sludges or muds, optionally together with a selected polymer and/or alum process residue (APR), in an amount so as to cause de-stabilization and flocculation of the solid particles. The floc and waste waters are separated, as by filtration. Surprisingly, not only excellent de-watering and sludge release are obtained by the addition of HCA, but color, organic materials and heavy metals are removed from the waste water filtrate as well. Other salts, such as iron or aluminum salts, can be added to the muds or sludges for purposes of odor control or phosphorus precipitation. Further, these additives reduce the generation of disinfection by-products in potable water supplies and also those compounds that cause color and odor.

DETAILED DESCRIPTION OF THE INVENTION

Process muds or sludges can be a very sticky, gummy material, particularly after de-watering chemicals have been added. The present de-watering method de-tackifies the sludge, resulting in a longer service life for the de-watering media. Further, cleaner media require less flushing or cleaning water additions. The present invention results in large cost savings, and also results in the generation of fewer solids from the cleaning step that must be recycled for further treatment.

The amount of HCA to be added varies depending on the source of the mud to be de-watered. For example, sludges from paper mills require less than about 1000 up to about 3000 ppm of HCA to be effective. However, highly colored sludges, particularly those containing significant amounts of heavy metal residues, may require from about 3000 up to about 10,000 ppm or more of HCA to de-water the sludge and remove color bodies.

The HCA also has a phosphorus sorption capacity of about 10 to about 1000 moles/kg. Thus the addition of HCA further results in a reduction of the soluble phosphorus recycling required from the de-watering process. Phosphorus is a chemical that is regulated in some effluent discharges because it contributes to eutrophication of the receiving water.

In addition, the sludge solids treated with HCA contain less water, which means these drier solids are easier to handle and save in hauling costs. Further, some landfills have a maximum requirement for water content; if the water content of a sludge is too high, disposal of the sludge becomes more of a problem. Thus there are more options available for disposal for low water content sludges.

Further, the present treatment provides rapid de-watering, and thus more sludge can be processed with already existing equipment. Bottlenecks in de-watering treatment can be eliminated, and may forestall the need for additional de-watering equipment for a given amount of sludge in a given plant.

Still further, since many wastewater plants have more than one type of sludge obtained from different unit processes, different de-watering methods for these various sludges may be required at a single site. The present invention permits different sludges to be treated using the same equipment. The HCA material may require only minimal adjustments, as to the amount and type of polymer and/or coagulant dosage required, which results in minimal re-treatment for treated sludge having an initially high water content. These features reduce manpower costs and result in capacity savings as well. The good coagulation of the waste waters also reduces the amount of solids and turbidity remaining in the waste water, filtrate, centrate, press-strate and the like, that may require re-treatment of the waste waters to remove them prior to discharge.

The use of HCA also reduces the amount of ferric chloride required in the treatment of sludges that use ferric chloride by from about 50 up to about 100%. For example, only 180 ppm of ferric chloride can be used instead of the 400 ppm that is usual. The presence of ferric chloride in process residues damages and corrodes the equipment used in de-watering. Thus the elimination of a portion of the ferric chloride employed during de-watering steps also reduces equipment maintenance, as well as procurement costs. Further, because ferric chloride products used to treat waste waters generally include other heavy metals as well, such as chromium, manganese, tin and the like, reducing or replacing treatment with ferric chloride also reduces the amount of other heavy metals that have to be removed from the wastewater and disposed of.

The invention will be further described in the following examples. However, these examples are meant to be illustrative only and the invention is not meant to be limited to the details described therein.

In the Examples, various samples of sludge material were mixed in 20 liter vessels. Aliquots of 200 ml each were dispensed to 250 ml disposable cups to which HCA was added in incremental dosages of from less than 1000 mg/l to over 5000 mg/l. Various amounts of synthetic water soluble polymers with anionic, cationic or nonionic charge characteristics, having various molecular weights, were also added. Incrementally added dosages of such polymers in amounts of from less than 25 ppm to over 200 ppm were employed. These polymers were thoroughly mixed to simulate plant conditions. The product performance of each mixture was evaluated as to: a) the speed of flocculation and filtration; b), the size of the floc; and c), the clarity and color of the filtered water.

Those mixtures that were deemed to be successful were poured onto samples of the de-watering media used in various test facilities. The drainage rate, color and clarity of the treated waters was also assessed. Lastly, the remaining sludge on the filter screens was manually compressed to determine sludge dryness, integrity and water release characteristics.

Color units are measured in terms of APHA terminology. For the waste waters used in these examples, only less than 100 color units was considered by the analysts to be "excellent"; less than 500 color units was considered to be "good"; 500-1000 color units was considered to be "fair"; 1000-5000 color units was considered to be "poor", and 5000-10,000 color units was considered to be "bad". The color of untreated samples was well in excess of 10,000 APHA color units.

Ferric chloride was also added to various of the mixtures as indicated.

EXAMPLE 1

This example evaluates a polymeric material, with and without the high clay alumina of the invention, as a de-watering agent, evaluating the resulting floc size, settled turbidity (ST) and filtered turbidity (FT), the filtration time in seconds and color remaining after treatment, in color units.

The results for a commercially available polymer, with and without the clay of the invention, are given in Table I below.

TABLE I

| Polymer Dose, ppm | Clay Dose, ppm | floc size | ST | FT | Filtration Time, sec |
|---|---|---|---|---|---|
| 300 | None | Med+ | cloudy | caked | 29 |
| 300 | 1000 | Med | clear | released | 14 |

Thus the addition of the clay of the invention to the polymer additive improved the turbidity of the treated water and reduced the filtration time by about one-half.

The following Table II illustrates treatment with alum, with and without a high clay alumina product.

TABLE II

| Alum dose, ppm | Clay, ppm | Floc size | Color |
|---|---|---|---|
| 1600 | None | M | Fair |
| 1400 | None | M | Poor |
| 1200 | None | S+ | Bad |
| 1000 | None | S | Bad |
| 1600 | 250 | M | Good |
| 1400 | 250 | M | Good |
| 1200 | 250 | M | Fair |
| 1000 | 250 | Poor | Poor |

Thus the addition of the clay of the invention to alum improved the removal of color bodies, which was unexpected.

EXAMPLE 2

Using raw water as a Control, the addition of liquid alum in mg/l, and of liquid alum plus 1% of a commercial polymer (alum+) was compared.

The results are given below in Table III. TOC is a measure of total organic carbon content.

TABLE III

| Alum | Alum +polymer | Floc size | ST | Color | TOC |
|---|---|---|---|---|---|
| Control (raw water) | | | | 308 | 880 |
| 7000 | | Large | fair | 16 | 360 |
| 6000 | | Small | good | 5 | 390 |
| 3000 | 2000 | Large | fair | 20 | |
| 3000 | 3000 | Large | good | 7 | 400 |
| 3000 | 4000 | Large | good | 12 | |
| 3030+ | 3000 | Large | very good | 0 | 390 |
| 3030+ | 4000 | Large | very good | 12 | |
| 2020+ | 3000 | Large | fair/gd | 11 | |
| — | APR 6000 | Large | good | 7 | 400 |
| — | APR 8000 | Large | good | 18 | |
| 5% acid alum | 3662 | Large | | 31 | |
| 5% acid alum | 2441 | Large | | 3 | 380 |

Thus all of the above treatments improved color and removed TOC from the water samples.

EXAMPLE 3

This example compares the addition of 5500 mg/l of liquid alum and other additives to raw water in terms of color and TOC removal. The data is summarized in Table IV.

TABLE IV

| Alum  | Dose | APR Dose | Floc  | ST     | Color | TOC |
|-------|------|----------|-------|--------|-------|-----|
| Alum  | 5500 | —        | Med   |        | 183   |     |
| Alum  | 5500 | 50       | Large | f/good | 5     |     |
| Alum  | 5500 | 100      | Large | fair   | 12    |     |
| Alum+ | 5500 | 50       | Small | good   | 0     | 380 |
| Alum+ | 5500 | 75       | Small | good   | 7     | 360 |
| Alum+ | 4545 | 1000     | Large | f/good | 38    | 350 |
| Alum+ | 4545 | 1500     | Large | good   | 18    | 350 |
| Alum+ | 4545 | 2000     | Large | v/good | 5     | 360 |

"Alum+" includes 1% of synthetic, water soluble cationic polymer

Thus even small amounts of additives improved color and reduced TOC.

The following water analysis compares an original plant sludge with the filtered sludge after treatment in accordance with the method of the invention, in ppm.

| Original element | Conc.   | Filtered Conc. |
|------------------|---------|----------------|
| Al               | 117,000 | 1.8            |
| Ba               | 65      | 0.13           |
| Ca               | 4100    | 86             |
| Cr               | 88      | <0.2           |
| Fe               | 6600    | 32             |
| K                | 860     | 53             |
| Mg               | 650     | 17             |
| Mn               | 640     | 15             |
| Na               | 14000   | 1100           |
| Ni               | 29      | 0.2            |
| P                | 1700    | <1             |
| S                | 2000    | 490            |
| V                | 160     | 0.2            |
| Zn               | 220     | 0.2            |
| As               | <45     | <1             |
| Mo               | 23      | <0.2           |
| Si               | 7000    | 2.4            |
| Sn               | <46     | <1             |
| Ti               | 1800    | <0.1           |
| Zr               | 42      | <0.2           |
| Hg               | <47     | <1             |

In all cases the amount of materials was reduced after filtration.

For performance enhancement, a part of the high clay alumina, up to an equal molar amount of metal basis of aluminum metal in the high clay alumina, may be substituted by additives such as ferric sulfate, aluminum chloride, polyaluminum chloride, aluminum chlorohydrate and blends of cationic polyelectrolytes and inorganic coagulants.

The present de-watering system improves capture of solids for separate disposal, and produces clearer and cleaner waste waters, that can be discharged into waterways after only a single de-watering treatment. This results in significant cost savings and treatment efficiencies for manpower, treatment chemicals and equipment.

Although the present invention has been described in terms of specific embodiments, the invention is not so limited and is to be limited only by the scope of the appended claims.

We claim:

1. A method of de-watering process muds and sludges comprising adding a high clay alumina to the process muds and sludges in an amount to cause detackification of the process muds and sludges, and flocculation and aggregation of solid particles in the process muds and sludges, and separating the particles and water wherein said high clay alumina is a coproduct of manufacturing aluminum sulfate, from bauxite.

2. A method according to claim 1 including adding a water soluble polymer to the process muds and sludges.

3. A method according to claim 2 wherein said polymer has an anionic charge.

4. A method according to claim 2 wherein said polymer has a cationic charge.

5. A method according to claim 2 wherein said polymer has a nonionic charge.

6. A method according to claim 1 including adding ferric chloride to the process muds and sludges.

7. A method according to claim 1 wherein alum process residues are also added to the process muds and sludges.

8. A method according to claim 1 including adding ferric sulfate to the process muds and sludges along with the high clay alumina.

9. A method according to claim 1 including adding polyaluminum chloride to the process muds and sludges along with the high clay alumina.

10. A method according to claim 1 including introducing along with the high clay alumina, an additive selected from aluminum chloride and aluminum chlorohydrate.

11. A method according to claim 1 including adding blends of cationic polyelectrolytes and inorganic coagulants along with the high clay alumina.

* * * * *